(12) United States Patent
Staade

(10) Patent No.: US 9,309,919 B2
(45) Date of Patent: Apr. 12, 2016

(54) SEALED SPHERICAL JOINT

(71) Applicant: Deere & Company, Moline, IL (US)

(72) Inventor: Dustin T. Staade, Dubuque, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/852,369

(22) Filed: Mar. 28, 2013

(65) Prior Publication Data
US 2014/0294486 A1  Oct. 2, 2014

(51) Int. Cl.
| F16C 11/06 | (2006.01) |
| B60G 7/00 | (2006.01) |
| B62D 7/16 | (2006.01) |
| E02F 3/76 | (2006.01) |

(52) U.S. Cl.
CPC ............ F16C 11/0671 (2013.01); B60G 7/005 (2013.01); B62D 7/16 (2013.01); E02F 3/7663 (2013.01); F16C 11/0642 (2013.01); B60G 2204/416 (2013.01); Y10T 403/32557 (2015.01); Y10T 403/32573 (2015.01); Y10T 403/32704 (2015.01)

(58) Field of Classification Search
CPC ................. F16C 11/06–11/086; B60G 7/005; B60G 2204/416; B62D 7/16; B62D 7/166
USPC .......... 403/114, 115, 122, 131, 134, 135, 113
See application file for complete search history.

(56) References Cited

U.S. PATENT DOCUMENTS

| 2,819,918 | A | * | 1/1958 | Seaquist ....................... 403/134 |
| 3,090,642 | A | * | 5/1963 | Gottschald et al. ........... 403/135 |
| 3,849,010 | A |   | 11/1974 | Herbenar |
| 3,958,904 | A | * | 5/1976 | Rusbach ........................ 403/90 |
| 4,273,461 | A | * | 6/1981 | Kjellstrand et al. .......... 403/125 |
| 4,613,251 | A | * | 9/1986 | Bellamy et al. ............... 403/135 |
| 4,695,180 | A | * | 9/1987 | Saito ............................. 403/114 |
| 4,819,919 | A | * | 4/1989 | Taylor .......................... 403/134 |
| 5,358,342 | A | * | 10/1994 | Frisbee et al. ................ 384/213 |
| 6,099,192 | A | * | 8/2000 | Free .............................. 403/114 |
| 6,273,198 | B1 | * | 8/2001 | Bauer et al. ................... 172/825 |

(Continued)

FOREIGN PATENT DOCUMENTS

| JP | 53-165976 | 6/1952 |
| JP | SHO54-165663 | 5/1953 |

(Continued)

OTHER PUBLICATIONS

Background Information (1 page)(admitted as prior art before Mar. 28, 2013).

(Continued)

Primary Examiner — Josh Skroupa
(74) Attorney, Agent, or Firm — Taft Stettinius & Hollister LLP; Stephen F. Rost

(57) ABSTRACT

A spherical joint comprises a socket, a ball stud, and a seal. The ball stud comprises a shaft, an inner ring positioned within an outer ring of the socket and within which the shaft is positioned, and a ring retainer attached to the shaft and retaining the inner ring to the shaft. The ring retainer provides an axial end of the ball stud relative to the axis. The outer ring and the inner ring comprise respectively a first spherical surface and a second spherical surface. The first and second spherical surfaces spherically mate with one another. The seal establishes a sealed connection between the outer ring and the inner ring. The socket and the ring retainer cooperate to provide a motion limiter that limits relative movement between the socket and the ball stud so as to prevent contact between the ring retainer and the seal.

20 Claims, 4 Drawing Sheets

(56) References Cited

U.S. PATENT DOCUMENTS

| | | |
|---|---|---|
| 6,941,685 B2 | 9/2005 | Goy et al. |
| 7,037,023 B2 * | 5/2006 | Monninghoff et al. ........ 403/122 |
| 7,083,356 B2 * | 8/2006 | Paduano ........................ 403/122 |
| 7,690,441 B2 | 4/2010 | Matsumoto et al. |
| 2007/0003360 A1 | 1/2007 | Ditzler |
| 2011/0110707 A1 * | 5/2011 | Schumacher ................... 403/26 |

FOREIGN PATENT DOCUMENTS

| | | |
|---|---|---|
| JP | 59-133818 | 8/1984 |
| JP | 60-154617 | 10/1985 |
| JP | 2000-55030 | 2/2000 |
| JP | 2002-89552 | 3/2002 |
| JP | 2002-097658 | 4/2002 |
| WO | 2007/032230 A1 | 3/2007 |

OTHER PUBLICATIONS

Deere Motor Grader Product Brochure (40 pages) (Jan. 2013).
Images of Motor Grader Ball-and-Socket Joint (3 pages) (admitted as prior art before Sep. 21, 2007).

\* cited by examiner

SEALED SPHERICAL JOINT

FIELD OF THE DISCLOSURE

The present disclosure relates to a spherical joint.

BACKGROUND OF THE DISCLOSURE

It is known to use a spherical joint on a motor grader, such as at a connection point between a lift cylinder and the draft frame. The spherical joint is lubricated with grease, and therefore is serviced from time to time to replenish the lubricant.

SUMMARY OF THE DISCLOSURE

According to an aspect of the present disclosure, a spherical joint comprises a socket, a ball stud, and a seal. The socket comprises an outer ring. The ball stud comprises a shaft, an inner ring within which the shaft is positioned, and a ring retainer attached to the shaft and retaining the inner ring to the shaft. The inner ring is positioned within the outer ring. The ring retainer provides an axial end of the ball stud relative to an axis of the shaft. The outer ring and the inner ring comprise respectively a first spherical surface and a second spherical surface. The first and second spherical surfaces spherically mate with one another. The seal establishes a sealed connection between the outer ring and the inner ring. The socket and the ring retainer cooperate to provide a motion limiter that limits relative movement between the socket and the ball stud so as to prevent contact between the ring retainer and the seal.

The above and other features will become apparent from the following description and the attached drawings.

BRIEF DESCRIPTION OF THE DRAWINGS

The detailed description of the drawing refers to the accompanying figures in which.

DETAILED DESCRIPTION OF THE DRAWINGS

Figure 1:
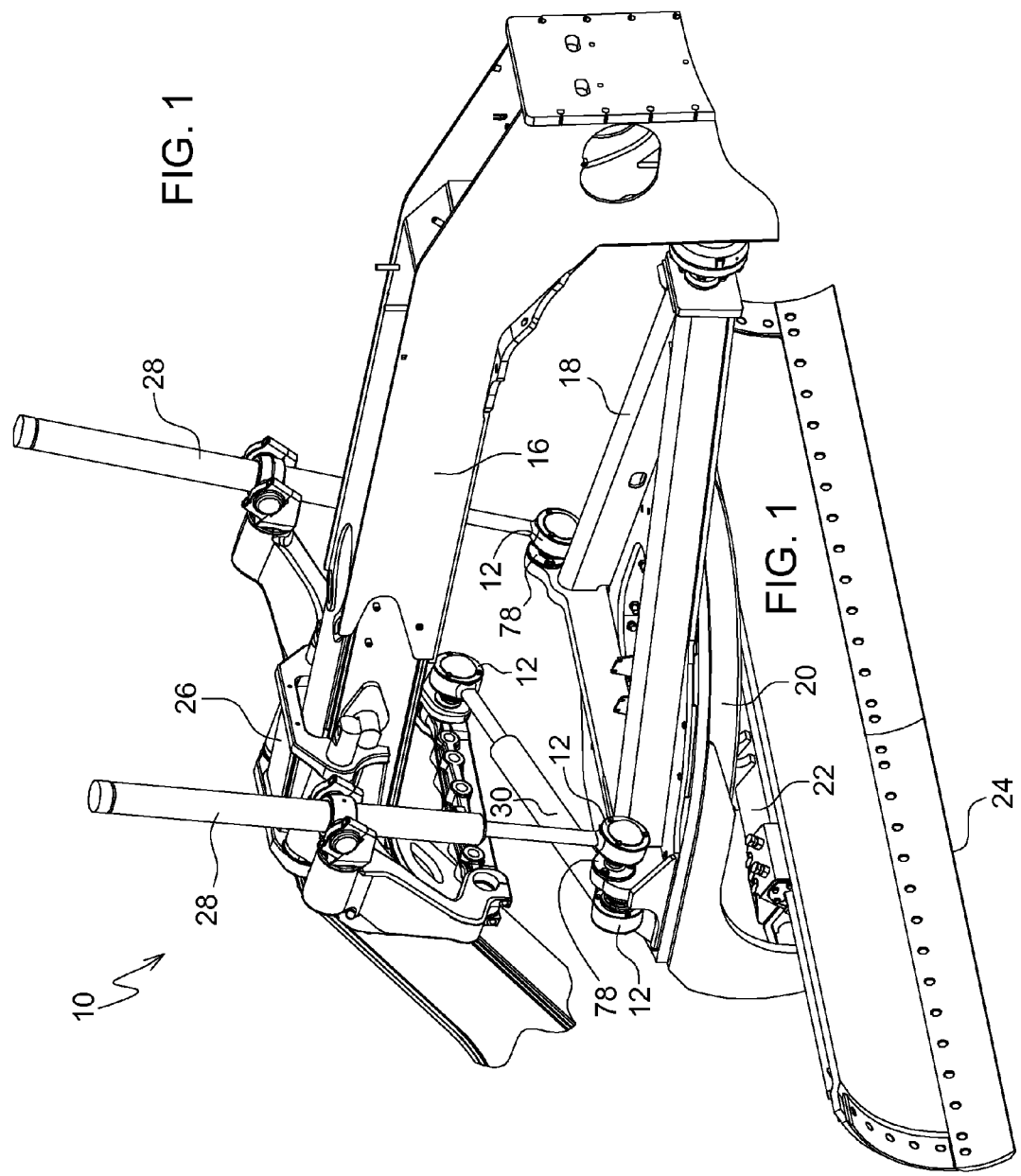
FIG. 1 is a perspective view representation showing a front section of a work vehicle in the form of, for example, a motor grader, the front section comprising a number of hydraulic cylinders attached to a draft frame respectively at connection points, one or more of those connection points configured as a spherical joint.

Referring to FIG. 1, a work machine 10 has a number of functions connected using one or more spherical joints 12. In the illustrated example, the work machine 10 is a motor grader comprising a front section and a rear section (not shown), the front and rear sections articulated to one another. The spherical joint 12 may be used with a wide variety of machines, the motor grader being but one example.

With respect to the motor grader, the front section 14 comprises a main frame 16, a draft frame 18 attached spherically to the main frame 16, a circle frame 20 attached to the draft frame 18 to rotate relative thereto by use of a circle drive (not shown) mounted to the draft frame 18, a tilt frame 22 attached pivotally to the circle frame 20 for pivotal movement of the tilt frame 22 relative to the circle frame 20 in response to operation of a hydraulic tilt cylinder (not shown), and a moldboard 24 held by the tilt frame 22 and side-shiftable relative to the tilt frame 22 in response to operation of a first side-shift cylinder (not shown).

A saddle 26 is mounted to the main frame 16. Left and right lift cylinders 28 are attached to the saddle 26 and the draft frame 18 for raising and lowering the sides of the draft frame 18, and thus the moldboard 24, relative to the main frame 16. Each lift cylinder 28 is attached to the draft frame 18 via, for example, a respective spherical joint 12.

A second side-shift cylinder 30 is attached to the saddle 26 and the draft frame 18 to side-shift the draft frame 18, and thus the moldboard 24, relative to the main frame 16. The side-shift cylinder 30 is attached to the saddle 26 via, for example, a spherical joint 12 and to the draft frame 18 via, for example, a spherical joint 12.

Figure 2:
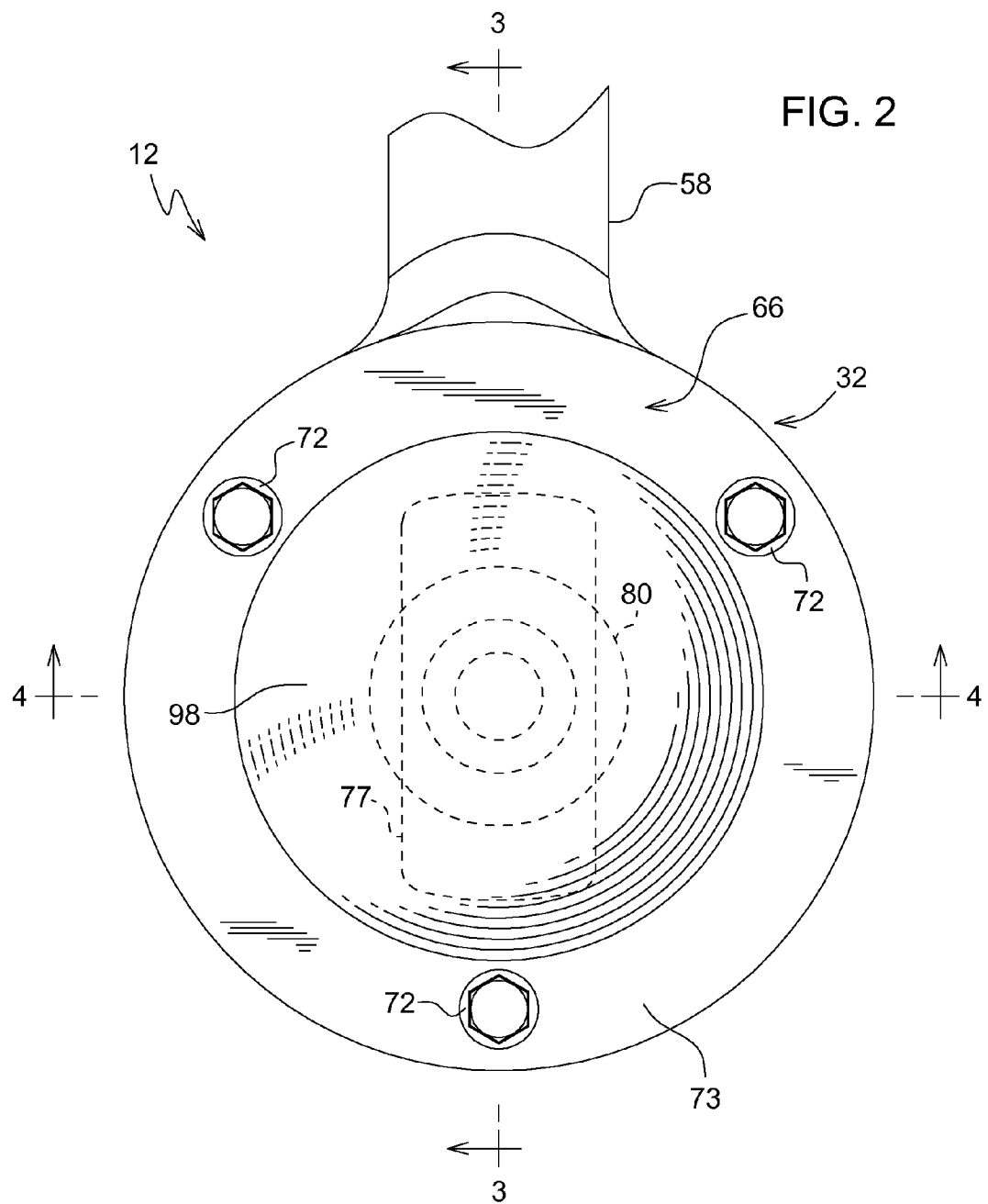
FIG. 2 is a perspective view representation of the spherical joint.
Figure 3:
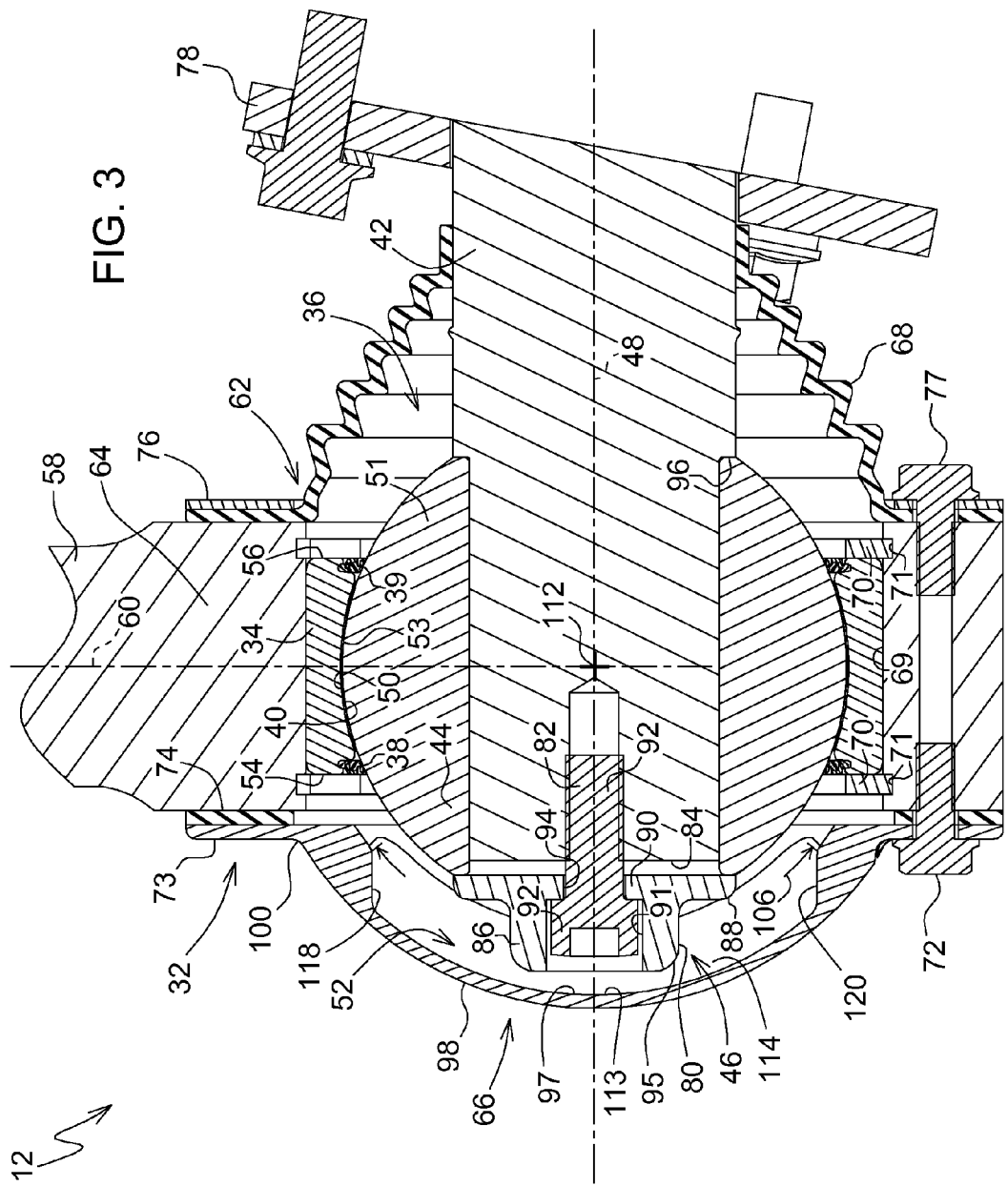
FIG. 3 is a sectional view taken along lines 3-3 of FIG. 2.
Figure 4:
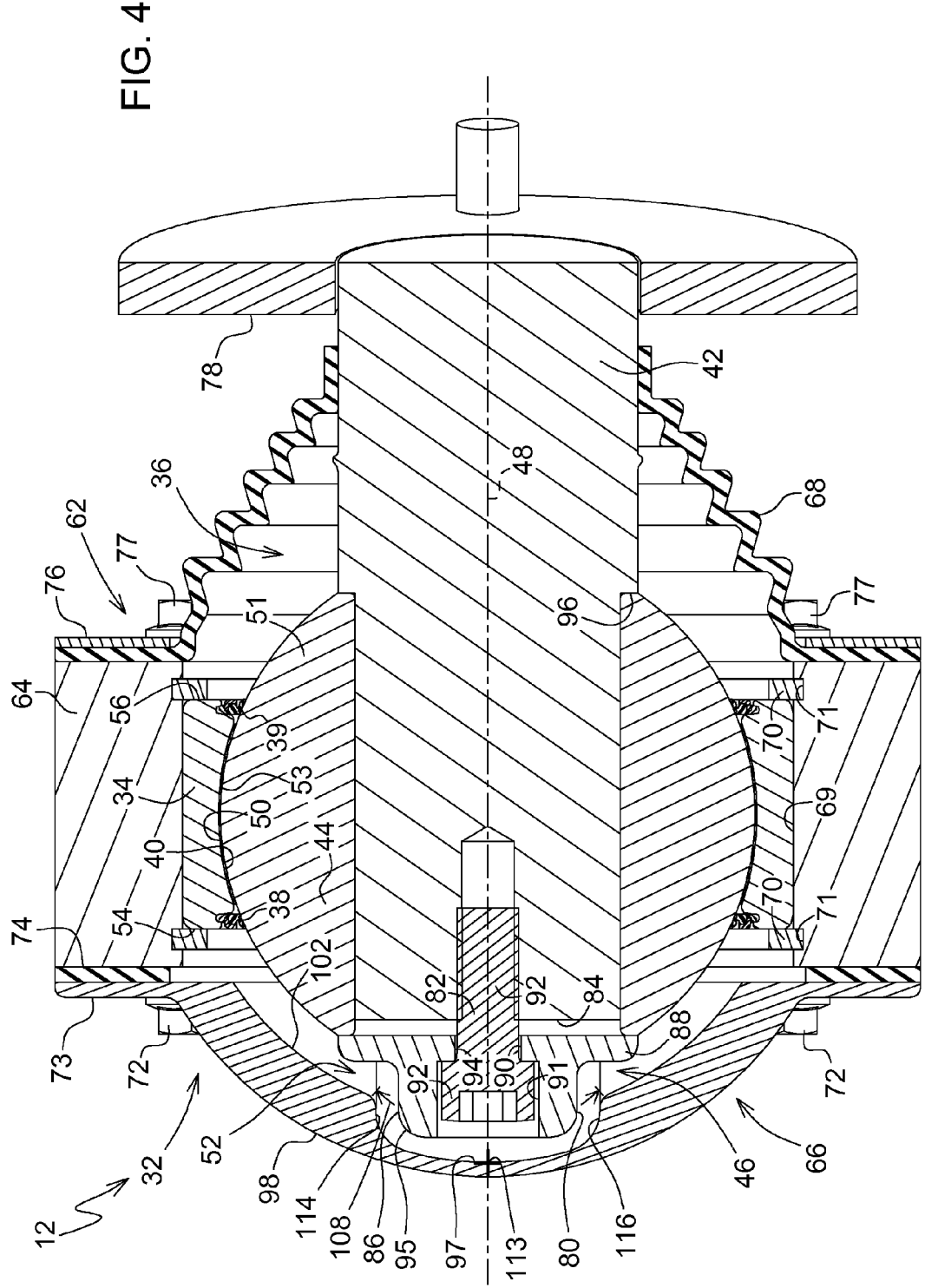
FIG. 4 is a sectional view taken along lines 4-4 of FIG. 2.

Referring to FIGS. 2-4, each spherical joint 12 is configured in a manner so as to minimize its maintenance. It is internally sealed such that it does not contain grease. To avoid internal damage to its sealing capacity, its range of motion is limited.

The spherical joint 12 comprises a socket 32. The socket 32 comprises an outer ring 34. The spherical joint 12 comprises a ball stud 36, and at least one seal 38. The outer ring 34 comprises a first spherical surface 40.

The ball stud 36 comprises a shaft 42, an inner ring 44, and a ring retainer 46. The shaft 42 is positioned within the inner ring 44. The ring retainer 46 is attached to the shaft 42 and retains the inner ring 44 to the shaft 42. The ring retainer 46 extends axially beyond the inner ring 44 relative to an axis 48 of the shaft 42 so as to provide an axial end of the ball stud 36 relative to the axis 48 (which may be referred to as a first axis). The inner ring 44 is positioned within the outer ring 34 and comprises a second spherical surface 50. The first and second spherical surfaces 40, 50 spherically mate with one another.

In the illustrated example, the inner ring 44 comprises a substrate or ball portion 51 and a layer 53 of low friction material. The ball portion 51 is made, for example, of steel with a radially outer polished surface, and the outer ring 34 is made, for example, of steel. The layer 53 is, for example, a liner made of polytetrafluoroethylene (TEFLON®), and is fixed to the radially outer surface of the substrate 51.

In another example, the layer 53 of low friction material may be applied to the outer ring 34 instead of the inner ring 44.

In yet another example, the layer 53 is omitted from the inner ring 44. The outer ring 34 or the inner ring 44 may be modified (or both) to provide a suitable interface between the rings 34, 44. Both rings 34, 44 may be made, for example, of steel, in which case grease or other lubricant may be provided for lubricating the interface between the rings 34, 44. Circumferential grooves may be formed in the outer ring 34 (or the inner ring 44, or both) for reception of the lubricant.

The seal 38 establishes a sealed connection between the outer ring 34 and the inner ring 44. The socket 32 and the ring retainer 46 cooperate to provide a motion limiter 52 that limits relative movement between the socket 32 and the ball stud 36 to prevent contact between the ring retainer 46 and the seal 38 (i.e., to prevent the ring retainer 46 and the seal 38 from contacting one another). Relative movement between a first structure (e.g., socket 32) and a second structure (e.g., ball stud 36) herein encompasses movement of the first structure relative to the second structure, movement of the second structure relative to the first structure, and movement of both structures relative to one another.

Exemplarily, the seal 38 is annular and is positioned at the interface between the outer and inner rings 34, 44 on a first side 54 of the outer ring 44. The seal 38 is a first seal.

The spherical joint 12 comprises an annular second seal 39. It is similar to the first seal 38 except that it is positioned at the interface between the outer and inner rings 34, 44 on a second side 56 of the outer ring 34. By limiting relative movement between the socket 32 and the ball stud 36, the motion limiter 52 prevents contact between the shaft 42 and the second seal 38 (i.e., prevents the shaft 42 and the second seal 39 from contacting one another.

Each seal 38, 39 may be configured, for example, as an over-molded construction. Exemplarily, it comprises a metal ring and an annular compressible layer that is over-molded onto the metal ring, is made, for example, of rubber, and contacts the outer and inner rings 34, 44.

Referring to FIG. 1, a spherical joint 12 may provide a connection point between a first component 58 and a second component to allow relative movement therebetween, and, as such, may be in combination with those components. For example, the first component 58 may be a hydraulic cylinder (or other type of fluid cylinder) attached to the socket 32. Where the machine 10 is a motor grader, the first component 58 may be a lift cylinder 28 or the side-shift cylinder 30. With respect to each lift cylinder 28, a spherical joint 12 may provide a connection point between the rod of the lift cylinder 28 and the draft frame 18 (an example of the second component). With respect to the side-shift cylinder 30, a spherical joint 12 may provide a connection point between the rod of the side-shift cylinder 30 and the saddle 26 (an example of the second component), and another spherical joint 12 may provide a connection point between the barrel of the side-shift cylinder 30 and the draft frame 18 (an example of the second component). Illustratively, in FIGS. 2-4, the spherical joint 12 is a connection point between the left hydraulic cylinder 28 (as the first component 58), in particular, its rod, and the draft frame 18 (as the second component).

Referring to FIG. 3, the component 58, exemplarily in the form of the rod of a lift cylinder 28, is attached to the socket 32 and has a longitudinal axis 60 (which may be referred to as a second axis). The motion limiter 52 limits relative rotation between the socket 32 and the ball stud 36 about the second axis 60 to prevent contact between the ring retainer 46 and the seal 38, but allows relative rotation between the socket 32 and the ball stud 36 about the first axis 48 since such relative rotation would not risk damage to either seal 38, 39.

The socket 32 comprises a housing 62 in which the outer ring 54 is positioned. The housing 62 comprises a mounting eye 64, a cover 66, and a boot 68. Exemplarily, the mounting eye 64 and the first component 58 (e.g., rod) are included in a monolithic (one-piece) body, although the mounting eye 64 is integrated into the housing 62 of the socket 32 such that it is conceptually considered part of the socket 62.

A sub-assembly comprises the outer ring 34, the ball stud 36 spherically mating with the outer ring 34, and the first and second seals 38, 39 installed at the interface between the outer and inner rings 34, 44, and is fitted into the mounting eye 64. In so doing, the outer ring 34 is pressed into the mounting eye 64 so as to be positioned within an aperture 69 of the mounting eye 64, after which a retainer clip 70 (e.g., E clip) of the housing 62 is installed in a corresponding annular groove 71 on either side of the outer ring 34.

The cover 66 is attached to the mounting eye 64 by use of, for example, a number of threaded first fasteners 72 of the housing 62 (e.g., three). The fasteners 72 attach an annular flange 73 of the cover 66 to a first side of the mounting eye 64, and are spaced unevenly about the center of the annular flange 73 to prevent assembly error. An annular gasket 74 of the housing 62 is positioned between the flange 73 and the mounting eye 64. The cover 66 is thus positioned to the first side of the mounting ring 64 so as to cover a first side of the aperture 69 but not a second side of the aperture opposite to the first side. The gasket 74 is made, for example, of a compressible material, such as, for example, an elastomer (e.g., rubber).

The boot 68 extends between the shaft 42 and the mounting eye 64, so as to inhibit ingress of debris into the spherical joint 12. The boot 68 is conically shaped so as to extend between to the shaft 42 and the mounting eye 64, and is convoluted to accommodate relative rotation between the shaft 42 and the mounting eye 64 about a third axis 112 perpendicular to the first axis 48 and the second axis 60 (FIG. 3). The boot 68 is made, for example, of a compressible material, such as, for example, an elastomer (e.g., rubber—the same material as the gasket 74).

At the narrow end of the boot 68, the boot 68 fits around the shaft 42 but is not fixed to the shaft 42, allowing relative rotation between the boot 68 and the shaft 42 so that the boot 68 does not tear. An annular bump included in the outer surface of the shaft 42 is positioned between the narrow end of the boot 68 and the inner ring 44 and acts as a barrier limiting any migration of the narrow end along the shaft 42 toward the inner ring 44.

At its opposite end, the boot 68 is attached to a second side of the mounting eye 64, opposite to the first side of the mounting eye 64, by use of an annular plate 76 of the housing 62 and a number of threaded second fasteners 77 of the housing 62 (e.g., three). The fasteners 77 extend through the annular plate 76 and the boot 68 into the mounting eye 64 and are spaced unevenly about the center of the plate 76, allowing the first component 58—when it is configured as a hydraulic cylinder—to be oriented relative to the axis 60 in a first orientation or a second orientation 180 degrees apart from the first orientation. The boot 68 is thus positioned to the second side of the mounting eye 64.

Referring to FIGS. 3 and 4, the ball stud 36 is attached to a second component, such as, for example, the draft frame 18, by use of an attachment device 78. The attachment device 78 comprises an annular plate and a number of threaded fasteners (e.g., three). The shaft 42 is positioned in and fixed to (e.g., welded) a hole of the plate of the device 78. Each of the fasteners of the device 78 comprises a threaded bolt and a washer, the bolt extending through the washer and the plate threadedly into the second component, thereby attaching the spherical joint 12 thereto. The fasteners of the device 78 are spaced unevenly about the center of the annular plate so that the plate and thus the shaft 42 fixed thereto are oriented properly during assembly. Proper orientation of the shaft 42 on assembly enables the joint 12 to accommodate the range of relative movement between the first and second components. Proper orientation of the shaft 42 may be thought of in terms of the angle ("tilt angle") between the axes 48, 60. Establishing a suitable tilt angle on assembly enables the range of relative movement between the first and second components.

The ring retainer 46 comprises an annular end cap 80 and a threaded fastener 82 (e.g., socket head cap screw). The fastener 82 attaches axially the end cap 80 to an end 84 of the shaft 42 relative to the axis 48.

The end cap 80 comprises an annular head 86, an annular flange 88, and an annular shoulder 90. The head 86 extends axially relative to the axis 48 of the shaft 42 and comprises a through-bore 91. The head 86 is, for example, an annular wall. The flange 88 extends radially outwardly from the head 86 relative to the axis 48 and contacts the inner ring 44 axially relative to the axis 48. The shoulder 90 extends radially inwardly from the head 86 relative to the axis 48.

The fastener 82 extends through the end cap 80. The fastener 82 is positioned within the through-bore 91 of the head 86 axially against the shoulder 90 relative to the axis 48 and extends into a blind threaded hole in the end 84 of the shaft 42.

The fastener 82 comprises a head 92 and a shank 93. The head 92 is configured, for example, as a socket head with internal flat faces to receive a socket tool for turning the fastener 82. The head 92 is positioned within the through-bore 91 and axially against the shoulder 90 relative to the axis 48. The shank 93 extends axially relative to the axis 48 through a hole 94 of the shoulder 90 into the blind threaded hole of the shaft 42.

The inner ring 44 is sandwiched between the ring retainer 46 and an annular shoulder 96 of the shaft 42. The shoulder 96 is annular and extends radially relative to the axis 48 of the shaft 42. The flange 88 of the end cap 80 and the shoulder 96 of the shaft 42 contact the inner ring 44 so as to sandwich the inner ring 44 therebetween upon tightening of the fastener 82 into the shaft 42, thereby attaching the inner ring 44 to the shaft 42.

The ring retainer 46 and the socket 32 mate with one another. The socket 32 comprises a channel 97 included in the motion limiter 52 and in which the ring retainer 46 is positioned.

The cover 66 comprises the channel 97. The cover 66 comprises a dome 98. The flange 73 is attached to an annular rim 100 of the dome 98 therearound so as to surround the dome 98 and extends radially outwardly from the rim 100.

The dome 98 comprises the channel 97. The dome 98 comprises a first recessed portion 102 (FIG. 4) recessed from the rim 100 and the flange 73. The channel 97 is a second recessed portion of the dome 98 recessed from the first recessed portion 102. The dome 98 is reduced in thickness at the channel 97 relative to the first recessed portion 102.

The ring retainer 46 extends axially into the channel 97 relative to the axis 48 of the shaft 42. The head 86 of the end cap 80 of the ring retainer 46 extends axially into the channel 97 relative to the axis 48 of the shaft 42.

The ring retainer 46 and the channel 97 cooperate to provide the motion limiter 52. As such, the ring retainer 46 and the channel 97 are profiled so as to limit relative rotation between the socket 32 and the ball stud 36 about the axis 60 of the component 58 to prevent contact between the ring retainer 46 and the first seal 38 and between the shaft 42 and the second seal 39.

The channel 97 is longer than it is wide. It has a length 106, a width 108, and a depth. The length 106 is greater than the width 108 and greater than the depth. The channel 97 extends along its length angularly relative to the third axis 112 and extends along its width angularly relative to the second axis 60. The channel 97 has a centerline 113 that extends lengthwise of the channel 97 (i.e., along its length) and is co-planar with the second axis 60 (the centerline 113 is illustrated as the edge of the section through the channel 97 in FIG. 3).

The width 108 of the channel 97 is relatively narrow. It is slightly greater than the outside diameter of the head 86, allowing relative rotation between the socket 32 and the ball stud 36 about the axis 48 of the shaft 42. However, its narrowness limits relative rotation between the socket 32 and the ball stud 36 about the axis 60, so as to protect the seals 38, 39.

The channel 97 comprises a first barrier 114 and a second barrier 116. As such, the motion limiter 52 comprises the barriers 114, 116. The ring retainer 46 and the first barrier 114 are arranged to limit relative rotation between the socket 32 and the ball stud 36 in a first direction about the second axis 60 upon contact between the ring retainer 46 and the first barrier, and the ring retainer 46 and the second barrier 116 are arranged to limit relative rotation between the socket 32 and the ball stud 36 in a second direction, opposite to the first direction, about the second axis 60 upon contact between the ring retainer 46 and the second barrier 116. Exemplarily, with respect to the ring retainer 46, it is the head 86 of the end cap 80 of the ring retainer 46 that is so arranged.

The first barrier 114 is a first side wall of the channel 97, and the second barrier 116 is a second side wall of the channel 97. Those walls extend lengthwise of the channel 97.

The ring retainer 46 and the channel 97 are profiled so as to allow relative rotation between the socket 32 and the ball stud 36 about the axis 48 of the shaft 42. Stated otherwise, they do not limit relative rotation between the socket 32 and the ball stud 36 about the axis 48 of the shaft 42. The head 86 comprises a convex portion 95 external to the through-bore 91 and configured to contact the barriers 114, 116 of the channel 97. The head 86 is circular relative to the axis 48 and the portion 95 is convex to facilitate relative rotation between the socket 32 and the ball stud 36 about the axis 48 if the head 86 and the channel 97 come into contact with one another.

The geometry of the machine 10 prevents contact between the ring retainer 46 and the first seal 38 and between the shaft 42 and the second seal 39 upon relative rotation between the socket 32 and the ball stud 36 about the third axis 112. As such, the channel 97 is designed to have a clearance between the ring retainer 46 and the end walls 118, 120 of the channel 97.

Welds and threads have not been shown in the drawings for simplification of illustration, it being understood that they would be well within the skill of one of ordinary skill in the art to provide those features without undue experimentation.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the appended claims.

What is claimed is:

1. A spherical joint, comprising
   a socket comprising an outer ring,
   a ball stud comprising a shaft, an inner ring within which the shaft is positioned, and a ring retainer attached to the shaft and retaining the inner ring to the shaft, the inner ring positioned within the outer ring, the ring retainer providing an axial end of the ball stud relative to an axis of the shaft, the outer ring and the inner ring comprising respectively a first spherical surface and a second spherical surface, the first and second spherical surfaces spherically mating with one another;
   a mounting eye attached to a housing of the socket for securing a component, the outer ring being fitted within the mounting eye such that the outer ring is configured to be maintained between the secured component and the inner ring; and
   a seal establishing a sealed connection between the outer ring and the inner ring; and
   a hollow dome comprising a recessed portion, the recessed portion of the hollow dome being secured to the socket, wherein the hollow dome is open so as to cover the ring retainer to provide a motion limiter that limits relative movement between the socket and the ball stud, thereby preventing contact between the ring retainer and the seal.

2. The spherical joint of claim 1, wherein the component has a longitudinal axis, the axis of the shaft is a first axis, the longitudinal axis of the component is a second axis, and the motion limiter limits relative rotation between the socket and the ball stud about the second axis to prevent contact between the ring retainer and the seal.

3. The spherical joint of claim 1, wherein the component is a hydraulic cylinder.

4. The spherical joint of claim 2, wherein the motion limiter comprises a first barrier and a second barrier, the ring retainer and the first barrier are arranged to limit relative rotation between the socket and the ball stud about the second axis upon contact between the ring retainer and the first barrier, and the ring retainer and the second barrier are arranged to limit relative rotation between the socket and the ball stud about the second axis upon contact between the ring retainer and the second barrier.

5. The spherical joint of claim 4, wherein the hollow dome comprises a channel in which the ring retainer is positioned, and the first barrier is a first side wall of the channel, the second barrier is a second side wall of the channel, and the first and second side walls extend lengthwise of the channel.

6. The spherical joint of claim 2, wherein the motion limiter allows relative rotation between the socket and the ball stud about the first axis.

7. The spherical joint of claim 1, wherein the ring retainer and the socket mate with one another.

8. The spherical joint of claim 1, wherein the hollow dome comprises a channel included in the motion limiter and in which the ring retainer is positioned.

9. The spherical joint of claim 8, in combination with a fluid cylinder attached to the socket and having a longitudinal axis, wherein the axis of the shaft is a first axis, the longitudinal axis of the fluid cylinder is a second axis, the channel has a length and a width, the length is greater than the width, the channel extends along its length angularly relative to a third axis perpendicular to the first axis and the second axis and extends along its width angularly relative to the second axis.

10. The spherical joint of claim 8, wherein the outer ring is positioned within an aperture of the mounting eye, and a cover covers a first side of the aperture but not a second side of the aperture opposite to the first side and comprises the channel; the hollow dome being part of the cover.

11. The spherical joint of claim 8, in combination with a fluid cylinder attached to the socket and having a longitudinal axis, wherein the channel is longer than it is wide and has a centerline that extends lengthwise of the channel and is co-planar with the longitudinal axis of the fluid cylinder.

12. The spherical joint of claim 1, wherein the hollow dome comprises a channel included in the motion limiter, the ring retainer comprises an end cap and a fastener attaching axially the end cap to an end of the shaft relative to the axis of the shaft, and the end cap extends axially into the channel relative to the axis of the shaft.

13. The spherical joint of claim 12, wherein the end cap comprises a head and a flange, the head extends axially into the channel relative to the axis of the shaft, and the flange extends radially outwardly from the head relative to the axis of the shaft and contacts the inner ring axially relative to the axis of the shaft.

14. The spherical joint of claim 13, wherein the end cap comprises a shoulder extending radially inwardly from the head of the end cap relative to the axis of the shaft, the fastener comprises a head and a shank, the head of the fastener is positioned within a through-bore of the head of the end cap and axially against the shoulder relative to the axis of the shaft, and the shank extends axially relative to the axis of the shaft through a hole of the shoulder into the shaft.

15. The spherical joint of claim 13, wherein the head is an annular wall.

16. The spherical joint of claim 13, wherein the head comprises a convex portion external to the through-bore and configured to contact the channel.

17. The spherical joint of claim 1, wherein the socket comprises the mounting eye and the hollow dome, the outer ring is mounted to the mounting eye in an aperture of the mounting eye, the hollow dome is fastened to the mounting eye on a side of the aperture, and the hollow dome comprises a channel included in the motion limiter and in which the ring retainer is positioned.

18. The spherical joint of claim 1, wherein the component has a longitudinal axis, wherein the axis of the shaft is a first axis, the longitudinal axis of the component is a second axis, the socket comprises the mounting eye, a cover, and a convoluted boot, the mounting eye is attached to the component, the cover comprises the hollow dome and an annular flange surrounding the hollow dome and attached to a first side of the mounting eye, the boot is attached to the shaft and a second side of the mounting eye opposite to the first side, the hollow dome comprises a channel that is longer than it is wide and has a centerline that extends lengthwise of the channel and is co-planar with the second axis, the channel is included in the motion limiter, the ring retainer is positioned in the channel, and the spherical joint further comprises another seal establishing a sealed connection between the outer ring and the inner ring.

19. The spherical joint of claim 18, wherein the socket comprises first fasteners attaching the annular flange to the mounting eye and second fasteners attaching the boot to the second side of the mounting eye.

20. The spherical joint of claim 18, wherein the component is a hydraulic cylinder.

\* \* \* \* \*